Figure 11:
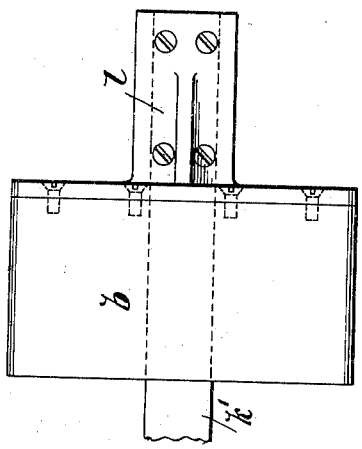

W. M. BARNES.
IRONING MACHINE.
APPLICATION FILED DEC. 7, 1905.
967,307.
Patented Aug. 16, 1910.
5 SHEETS—SHEET 1.
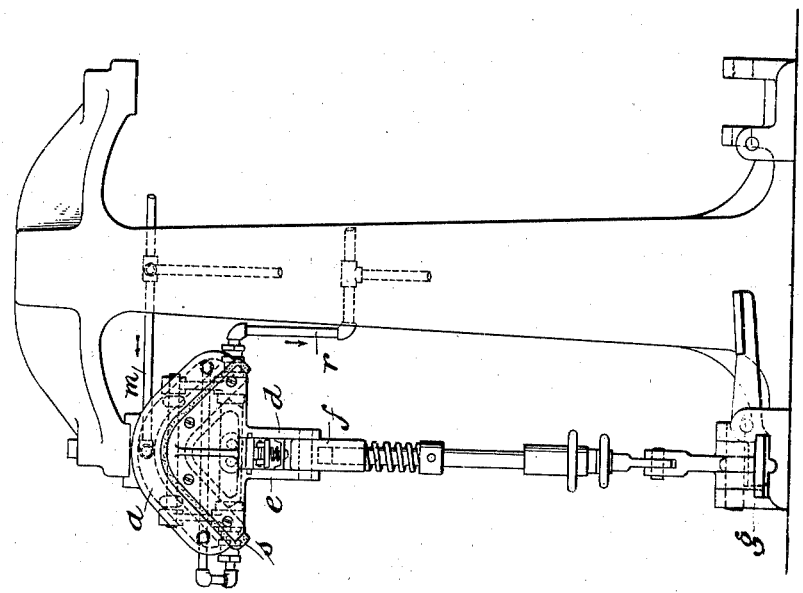
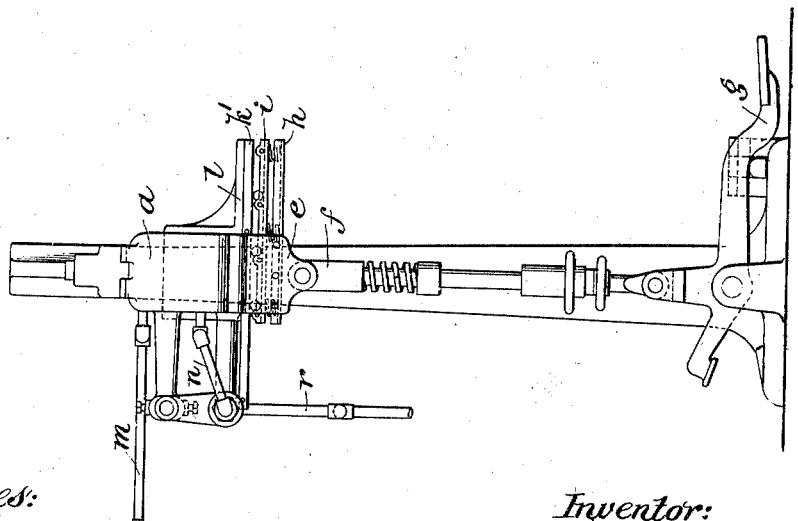
Witnesses:
Henry Drury
M. M. Hamilton
Inventor:
William M. Barnes
Harding & Harding
Attys

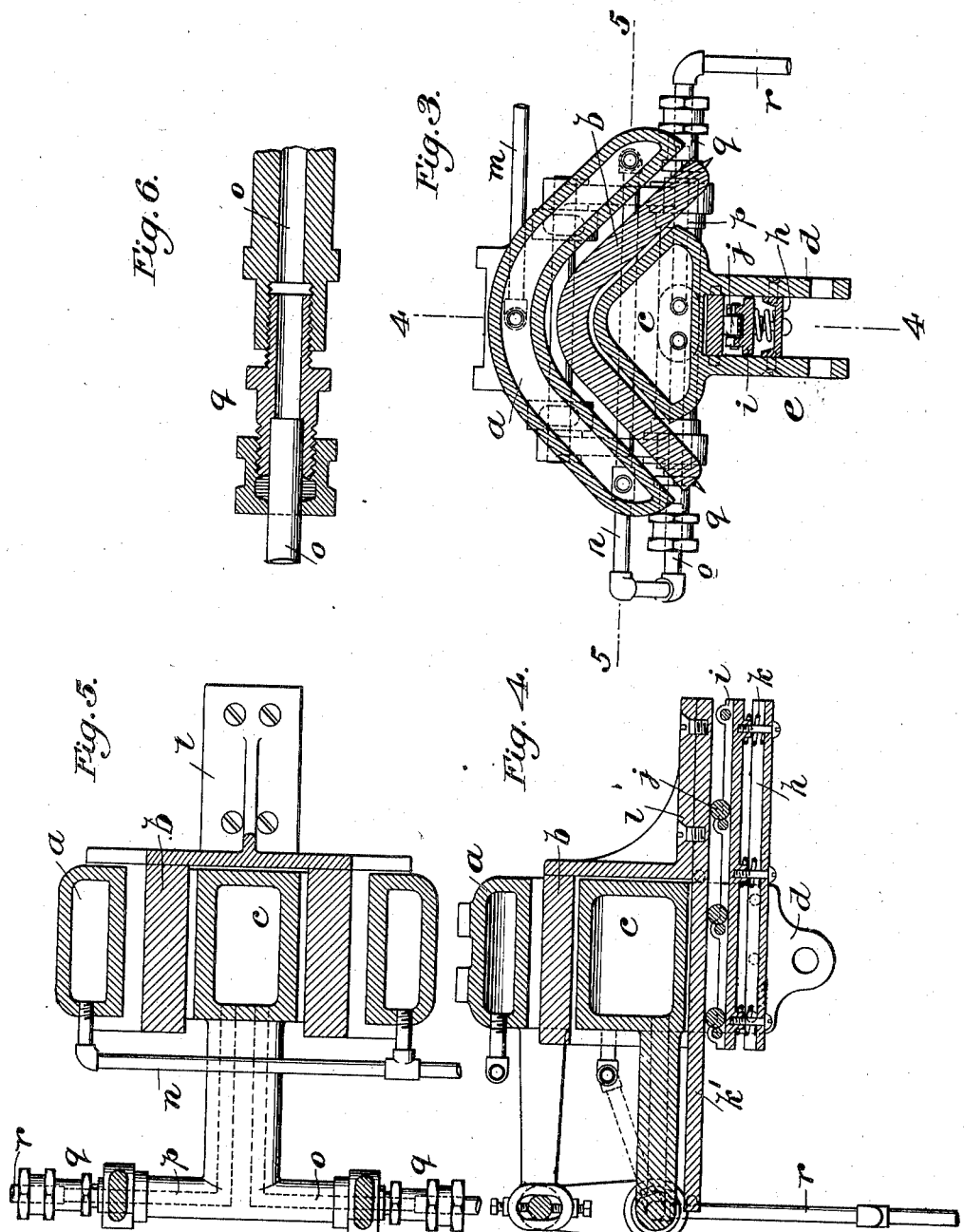

W. M. BARNES.
IRONING MACHINE.
APPLICATION FILED DEC. 7, 1905.

967,307.

Patented Aug. 16, 1910.

5 SHEETS—SHEET 3.

Witnesses:
Henry Drury
M. M. Hamilton

Inventor:
William M. Barnes

W. M. BARNES.
IRONING MACHINE.
APPLICATION FILED DEC. 7, 1905.
967,307.
Patented Aug. 16, 1910.
5 SHEETS—SHEET 4.
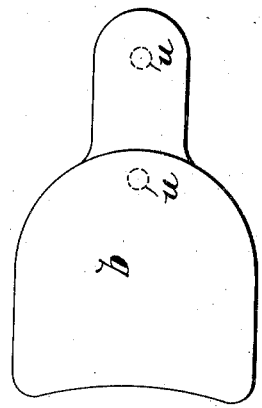
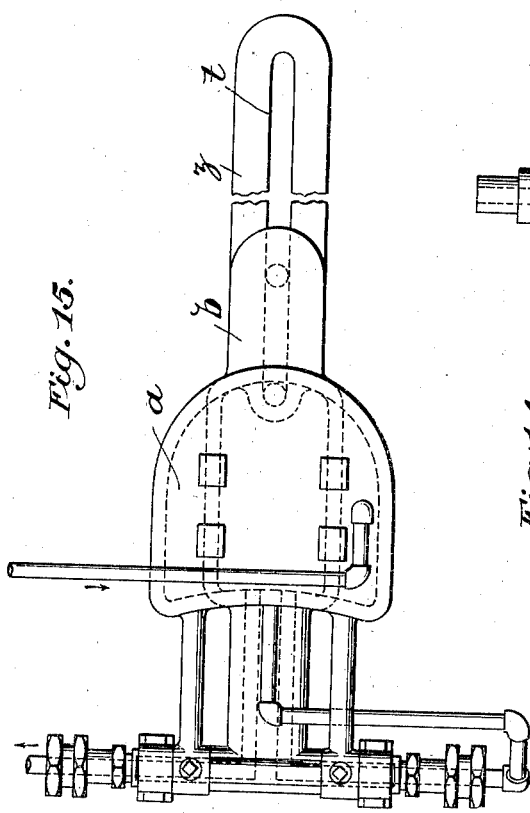
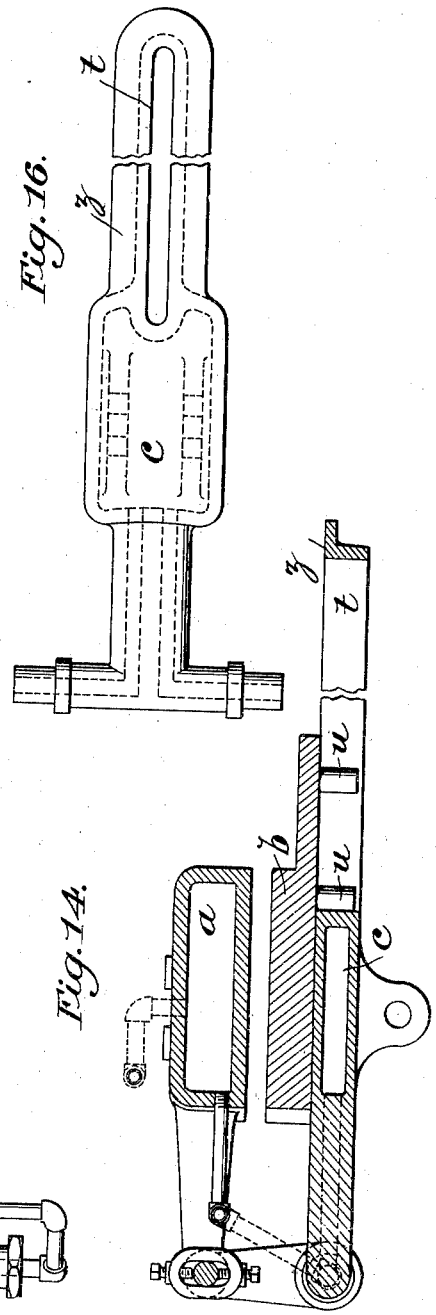
Witnesses:
Inventor:

W. M. BARNES.
IRONING MACHINE.
APPLICATION FILED DEC. 7, 1905.
967,307.
Patented Aug. 16, 1910.
5 SHEETS—SHEET 5.
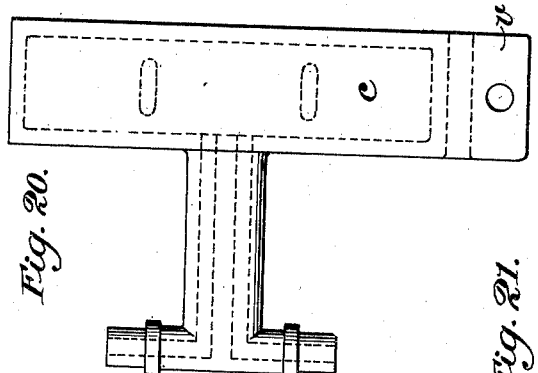
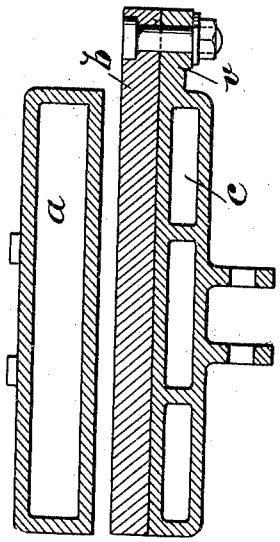
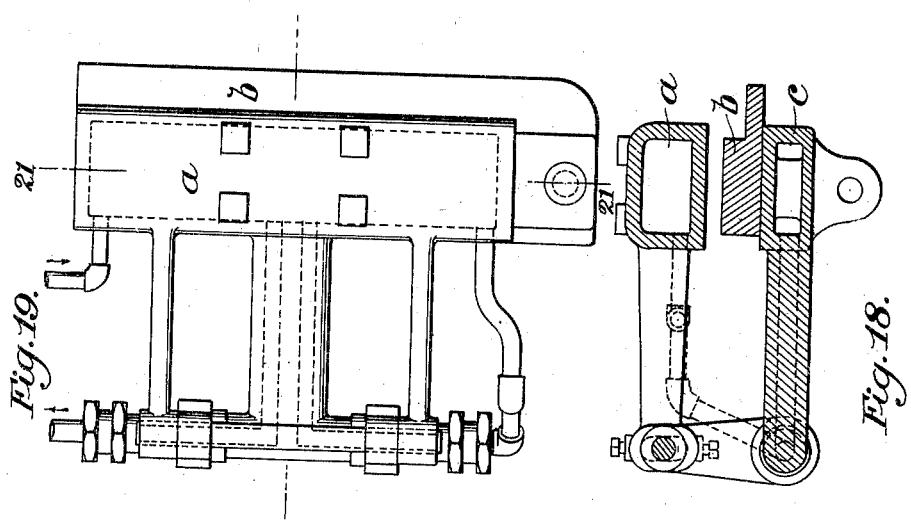
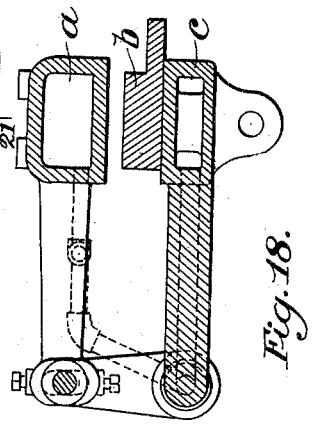
Witnesses:
Inventor:
William M. Barnes

UNITED STATES PATENT OFFICE.

WILLIAM M. BARNES, OF PHILADELPHIA, PENNSYLVANIA, ASSIGNOR, BY MESNE ASSIGNMENTS, TO AMERICAN LAUNDRY MACHINERY COMPANY, OF CINCINNATI, OHIO, A CORPORATION OF OHIO.

IRONING-MACHINE.

967,307.     Specification of Letters Patent.     Patented Aug. 16, 1910.

Application filed December 7, 1905. Serial No. 290,662.

*To all whom it may concern:*

Be it known that I, WILLIAM M. BARNES, a citizen of the United States, residing at Philadelphia, county of Philadelphia, and State of Pennsylvania, have invented a new and useful Improvement in Ironing-Machines, of which the following is a full, clear, and exact description, reference being had to the accompanying drawings, which form a part of this specification.

My invention relates to that class of ironing machines in which the article to be ironed is placed upon the ironing table, which is moved vertically into contact with a stationary heated chest or plate. In such class of machines as now used only one face of the ironing table, when exposed to the action of the stationary heated chest or plate, is subjected to heating action.
My invention has for its object provision in such class of machines whereby the ironing table may be heated upon both faces.

Speaking generally, my invention consists in providing a fixed heated chest and a vertically movable heated chest in alinement with the fixed heated chest and an ironing table which rests upon and receives the heat from the vertically movable heated chest. The ironing table, when in vertical alinement with the vertically movable chest, is movable therewith and is capable of being moved out of such vertical alinement. The heated chest is provided with means to admit heat from a source external to the chest. I also provide means whereby the ironing table may be moved away from the vertically movable heated chest, to enable the article to be placed thereon for the purpose of being ironed and removed therefrom after ironing. Preferably, I use a chest or hollow casing for both the fixed and vertically movable heating mediums or devices. Preferably, also, with respect to the vertically movable heated chest, the inlet and outlet steam heating pipes are connected by swiveling or turning connections, respectively, with the main live steam and exhaust pipes. Such provision only is necessary because there is only necessity to provide for heat connections, which will permit the vertically movable chest, with its carried ironing table, to move vertically. The ironing table proper, having its lateral movement independent of the vertically movable heated chest and receiving its heat by conduction from said heated chest, can readily be moved into and out of contact and operative relation therewith without any necessity for complicated heat connections.

The foregoing and certain other details of construction, hereinafter fully set forth, form the subject matter of the invention of this application.

I will first describe the embodiments of my invention as disclosed in the accompanying drawings and then point out the invention in the claims.

Figure 12:
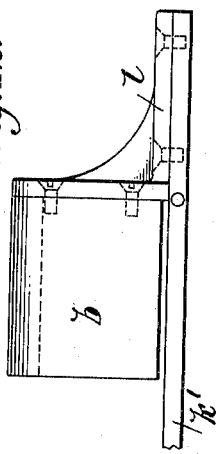
Figure 13:
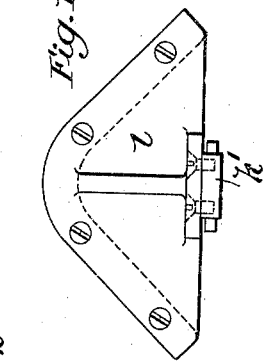
Figure 9:
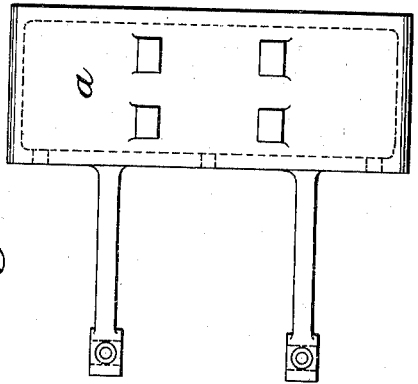
Figure 10:
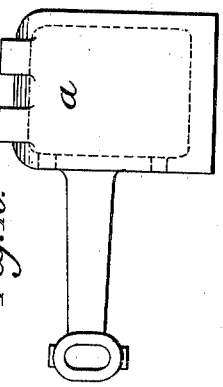
Figure 7:
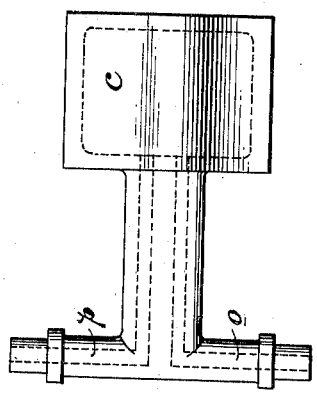
Figure 8:
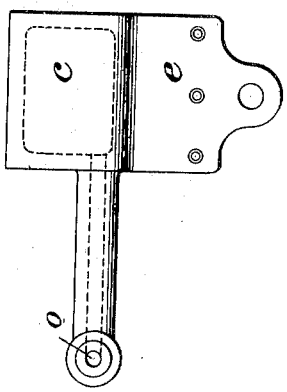

In the drawings: Figure 1 is a front elevation of the machine. Fig. 2 is a side elevation. Fig. 3 is an enlarged cross sectional view through the ironing devices. Fig. 4 is a vertical sectional view on the line 4—4, Fig. 3. Fig. 5 is a sectional plan view on the line 5—5, Fig. 3. Fig. 6 is an enlarged sectional view of one of the swivel joints. Fig. 7 is a plan view of the vertically movable heated chest. Fig. 8 is a side elevation thereof. Fig. 9 is a plan view of the stationary heated chest. Fig. 10 is a side elevation thereof. Fig. 11 is a plan view showing upper portion of ironing table. Fig. 12 is a side elevation thereof. Fig. 13 is an end view of the same. Fig. 14 is a longitudinal sectional view of a modified form of ironing table and vertically movable chest. Fig. 15 is a plan view of the same. Fig. 16 is a plan view of the vertically movable steam chest of this modified form of construction. Fig. 17 is a plan view of ironing table, *b*, extension thereof and lugs. Fig. 18 is a longitudinal sectional view of another modified form of ironing table and vertically movable chest. Fig. 19 is a plan view thereof. Fig. 20 is a plan view of the vertically movable chest, its lateral extension and pivot part for upper portion of ironing table. Fig. 21 is a cross sectional view on the line 21—21 Fig. 19.

Speaking first of the construction of Figs. 1 to 13, *a* is the stationary heated chest.

*b* is the ironing table and *c* the vertically movable heated chest. The chest *c* is cored out and has the extensions or treadle lugs *e* and *d* to which is pivotally connected the head *f*, to which is connected the treadle *g* for vertically moving said part *c*, so that when the ironing table is superimposed upon the chest $c$ they both move vertically, and together, bringing the ironing table into contact with the stationary heated chest $a$.

$h$ is a channel iron secured to the lugs $d$ and $e$.

$i$ is a roller race in which are the rollers $j$.

Between the roller race and the channel iron are coil springs $k$. Resting upon the rollers $j$ is the plate $k'$, which plate, by bracket $l$, is secured to the ironing table $b$.

$m$ is the main steam pipe, which enters the chest $a$.

$n$ is a pipe passing therefrom.

$o$ is a pipe entering the vertically movable chest $c$ and $p$ is a pipe extending from said chest $c$. The pipe $o$ is connected with the pipe $n$ by the swivel joint $q$ and the pipe $p$ is connected with the exhaust pipe $r$ by a corresponding joint $q$ so that the vertically movable chest $c$ may move vertically without affecting its steam and exhaust connections.

The ironing table $b$ is provided with a padding $s$ upon which the article to be pressed is placed.

As may be seen from the foregoing description, when the treadle $g$ is released, the springs lift the ironing table from the vertically movable heated chest and the ironing table may be readily pulled out for the removal of the pressed or ironed article, or the placing thereon of an article to be pressed or ironed. The ironing table $b$, with the article to be ironed, is, after the article to be ironed is placed thereon, pushed over the vertically movable chest $c$. When the treadle $g$ is operated, the vertically movable heated chest is lifted against the ironing table and the chest and ironing table lifted so that the article to be pressed is brought against the fixed surface of the fixed steam chest $a$, the swivel joints $q$ allowing this vertical movement without destroying the heat connections to the vertically movable chest $c$. Thus the ironing table is heated on one side by contact with the vertically movable chest $c$, both plates $b$ and $c$ being of metal.

In Figs. 14 to 17 is shown a machine, specifically designed to iron or press yokes of shirts. The construction, irrespective of shape and with the following differences, is similar to that of the preceding figures. The differences relate to the mechanism for withdrawing the ironing table $b$. In the construction of Figs. 14 to 17, the vertically movable chest $c$ is provided with an extension $z$, provided with the slot or guide $t$. In this slot are lugs $u$ projecting from one end of the ironing table $b$ and from an extension thereof.

In Figs. 18 to 21 is shown a machine specifically designed for pressing or ironing wrist bands or neck bands. The chest $c$ has a lateral extension $v$, to which is pivoted an extension from the ironing table $b$. In this case, the ironing table $b$, instead of sliding away from the chest $c$, swings away from it.

In all of these constructions, as may be seen, the ironing table, in action, is acted upon by a heated chest or plate upon both sides of said ironing table, and thus the ironing table is subjected to heat upon both sides.

When in this specification and in the hereinafter recited claims I have used, or use, the term "chest", I intend to include a plate, from which heat is capable of being conducted to the ironing table or the article on the ironing table.

Having now fully described my invention, what I claim and desire to protect by Letters Patent is—

1. In an ironing machine, in combination, a fixed heated chest, a vertically movable heated chest in alinement with the fixed heated chest, and an ironing table upon the vertically movable heated chest, said ironing table being movable to and away from contact with said vertically movable heated chest.

2. In an ironing machine, in combination, a fixed heated chest, a vertically movable heated chest in alinement with the fixed heated chest, and an ironing table upon the vertically movable heated chest, said ironing table being movable laterally to and away from alinement with said vertically movable heated chest and movable into contact therewith.

3. In an ironing machine, in combination, a fixed heated chest, a vertically movable heated chest, an ironing table, movable laterally into and away from alinement with said vertically movable heated chest and vertically into and out of contact with said vertically movable heated chest.

4. In an ironing machine, in combination, a fixed heated chest, a vertically movable heated chest, an ironing table movable laterally into and away from alinement with said vertically movable heated chest, and vertically into and out of contact with said vertically movable heated chest, a pipe to convey heat to the vertically movable chest, and connections for said pipe permitting the movement of said vertically movable chest to and from the fixed heated chest.

5. In a machine of the character described, in combination, an ironing table, a heated chest, a spring or springs normally holding the ironing table out of contact with the chest, said ironing table being movable into and out of vertical alinement with said chest.

6. In a machine of the character described, in combination, an ironing table, a chest, a spring or springs normally holding the ironing table out of contact with the chest, said ironing table being movable into and out of vertical alinement with said chest, means to heat the chest, and means to simultaneously move both table and chest.

7. In a machine of the character described, in combination, a supplemental plate having extensions, a roller race having rollers therein, a spring support for said race carried by said plate extensions, a plate supported upon the rollers of said roller race, an ironing table superimposed upon said supplemental plate and carried by said plate supported by the rollers.

In testimony of which invention, I have hereunto set my hand, at Philadelphia, on this 1st day of December, 1905.

WILLIAM M. BARNES.

Witnesses:
M. M. HAMILTON,
THORNLEY B. WOOD.